United States Patent
Cheong et al.

(10) Patent No.: US 9,167,590 B2
(45) Date of Patent: Oct. 20, 2015

(54) APPARATUS AND METHOD FOR ALLOCATING CHANNEL IN COMMUNICATION SYSTEM

(71) Applicant: Electronics and Telecommunications Research Institute, Daejeon (KR)

(72) Inventors: Min-Ho Cheong, Daejeon (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 13/717,622

(22) Filed: Dec. 17, 2012

(65) Prior Publication Data

US 2013/0188506 A1 Jul. 25, 2013

(30) Foreign Application Priority Data

Dec. 15, 2011 (KR) ........................ 10-2011-0135685

(51) Int. Cl.
*H04L 12/26* (2006.01)
*H04J 3/14* (2006.01)
*H04W 72/08* (2009.01)
*H04W 16/14* (2009.01)
*H04W 72/04* (2009.01)

(52) U.S. Cl.
CPC ............ *H04W 72/085* (2013.01); *H04W 16/14* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 2007/0060155 A1* | 3/2007 | Kahana et al. | 455/450 |
| 2011/0299417 A1* | 12/2011 | Nanda et al. | 370/252 |
| 2012/0314673 A1* | 12/2012 | Noh et al. | 370/329 |
| 2013/0017794 A1* | 1/2013 | Kloper et al. | 455/63.1 |
| 2014/0050093 A1* | 2/2014 | Liu et al. | 370/235 |

* cited by examiner

*Primary Examiner* — Edan Orgad
*Assistant Examiner* — Rebecca Song

(57) ABSTRACT

A channel allocation apparatus in a communication system includes: a measuring unit configured to measure clear channel assessments (CCA) of a plurality of stations (STAs) included in the communication system; a checking unit configured to compare the measured CCAs to preset reference CCA, and check fairness and unfairness in the STAs; and an allocating unit configured to change and allocate channels allocated to STAs corresponding to unfairness, according to the measured CCA and the reference CCA.

8 Claims, 4 Drawing Sheets

APPARATUS AND METHOD FOR ALLOCATING CHANNEL IN COMMUNICATION SYSTEM

CROSS-REFERENCE TO RELATED APPLICATIONS

The present application claims priority of Korean Patent Application No. 10-2011-0135685, filed on Dec. 15, 2011, which is incorporated herein by reference in its entirety.

BACKGROUND OF THE INVENTION

1. Field of the Invention

Exemplary embodiments of the present invention relate to a communication system; and, more particularly, to a channel allocation apparatus and method which is capable of minimizing adjacent channel interference (hereafter, referred to as 'ACI') in a communication system.

2. Description of Related Art

In a current communication system, research has been actively conducted to provide various qualities of services (hereafter, referred to as 'QoS') of services having a high transmission rate to users. Examples of the communication system may include a wireless local area network (hereafter, referred to as 'WLAN') system. In the WLAN system, research has been actively conducted on a variety of methods for stably transmitting large-volume data at high speed through limited resources. Particularly, in a communication system, research has been conducted on data transmission through wireless channels. Recently, in the WLAN system, there have been proposed a variety of methods for normally transmitting and receiving large-volume data by effectively using limited wireless channels.

Meanwhile, in a current communication system, there have been proposed a variety of methods for transmitting and receiving large-volume data to a plurality of users by effectively using limited frequency channels. Particularly, in a current WLAN system, there have been proposed methods for normally transmitting and receiving data by effectively using limited frequency channels, when a base station, for example, an access point (hereafter, referred to as 'AP') and a plurality of terminals corresponding to a plurality of users, for example, stations (hereafter, referred to as 'STAs') transmit and receive large-volume data through the limited frequency channels.

In the current WLAN system, however, when the limited frequency channels are allocated to the plurality of STAs and large-volume data are then transmitted and received through the allocated frequency channels, adjacent frequency channels may be allocated to the plurality of STAs. When the data are transmitted and received through the allocated frequency channels, interference may occur between the adjacent channels of the allocated frequency channels, that is, ACI may occur. Due to the ACI, the data may not be normally transmitted and received.

Therefore, there is a demand for a channel allocation method for normally transmitting and receiving data by minimizing ACI in frequency channels allocated to a plurality of STAs, when large-volume data are transmitted and received between an AP and the plurality of STAs through limited frequency channels in a communication system, for example, the WLAN system.

SUMMARY OF THE INVENTION

An embodiment of the present invention is directed to a channel allocation apparatus and method in a communication system.

Another embodiment of the present invention is directed to a channel allocation apparatus and method for normally transmitting and receiving large-volume data by minimizing adjacent channel interference (ACI) in frequency channels for transmitting and receiving large-volume data in a communication system.

Another embodiment of the present invention is directed to a channel allocation apparatus and method for minimizing ACI in frequency channels allocated to a plurality of stations (STAs) when large-volume data are transmitted and received through the frequency channels allocated to the STAs in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a channel allocation apparatus in a communication system includes: a measuring unit configured to measure clear channel assessments (CCA) of a plurality of stations (STAs) included in the communication system; a checking unit configured to compare the measured CCAs to preset reference CCA, and check fairness and unfairness in the STAs; and an allocating unit configured to change and allocate channels allocated to STAs corresponding to unfairness, according to the measured CCA and the reference CCA.

In accordance with another embodiment of the present invention, a channel allocation method in a communication system includes: measuring CCAs of a plurality of STAs included in the communication system; checking fairness and unfairness of the STAs by comparing the measured CCAs to preset reference CCA; and changing and allocating channels allocated to STAs corresponding to unfairness according to the measured CCAs and the reference CCA.

DESCRIPTION OF SPECIFIC EMBODIMENTS

Figure 1:
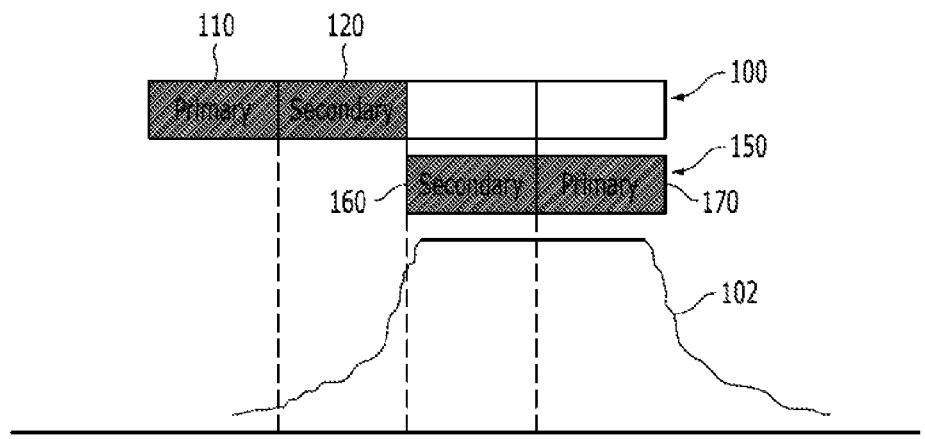
FIG. 1 is a diagram for explaining ACI in an OBSS in a communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The embodiments of the present invention provide an apparatus and method for allocating channels in a communication system, for example, a WLAN system. In the embodiments of the present invention, the WLAN system will be taken as an example for description. However, the channel allocation apparatus and method in accordance with the embodiments of the present invention may be applied to other communication systems.

Furthermore, the embodiments of the present invention provide an apparatus and method for allocating frequency channels in an IEEE 802.11n system or IEEE 802.11ac system as a communication system, for example, a WLAN system. More specifically, the embodiments of the present invention provide an apparatus and method for allocating frequency channels in a basic service set (hereafter, referred to as 'BSS') based on the IEEE 802.11n system and an overlapping basic service set (hereafter, referred to as 'OBSS') based on the IEEE 802.11ac system.

Furthermore, the embodiments of the present invention provide an apparatus and method for allocating channels to minimize ACI in limited frequency channels which are allocated to a plurality of terminals corresponding to a plurality of users, for example, a plurality of STAs in a communication system, for example, a WLAN system in order to transmit and receive large-volume data. In the communication system in accordance with the embodiments of the present invention, frequency channels for transmitting and receiving data between a base station, for example, an AP and a plurality of STAs are allocated. At this time, when the data are transmitted and received, the channels are allocated to the STAs such that the ACI may be minimized, in order to normally transmit and receive large-volume data.

Furthermore, in the embodiments of the present invention, channels are allocated to a plurality of STAs to minimize ACI when data are transmitted and received through frequency channels between an AP and the plurality of STAs in a communication system, for example, a WLAN system, or particularly, an OBSS in which the IEEE 802.11n system and the IEEE 802.11ac system coexist, and to minimize the ACI through clear channel assessment (CCA) in the channels allocated to the plurality of STAs. In this case, fairness may be given to the plurality of STAs. In the embodiments of the present invention, CCA of STAs included in the IEEE 802.11n system and CCA of STAs included in the IEEE 802.11ac system are measured, and unfairness of the STAs included in the IEEE 802.11n system and unfairness of the STAs included in the IEEE 802.11ac system are checked based on the CCAs. Then, channels of STAs in an unfair state, or particularly, primary and secondary channels are reallocated to minimize ACI when data are transmitted to or received from the plurality of STAs, and fairness is given to the STAS to normally transmit and receive large-volume data. That is, in the embodiments of the present invention, the channels are allocated to the STAs so as to give fairness in the primary and secondary channels of the STAs through the CCA. Accordingly, ACI may be minimized to normally transmit and receive data. Hereafter, referring to FIG. 1, ACI in the OBSS in the communication system in accordance with the embodiments of the present invention will be described in more detail.

FIG. 1 is a diagram for explaining ACI in an OBSS in a communication system in accordance with an embodiment of the present invention.

Referring to FIG. 1, the communication system includes WLAN systems as OBSS, for example, an IEEE 802.11ac system (hereafter, referred to as 'first system') and an IEEE 802.11n system (hereafter, referred to as 'second system'). A first primary channel 110 and a first secondary channel 120 are allocated to STAs 100 of the first system, and a second primary channel 170 and a second secondary channel 160 are allocated to STAs 150 of the second system.

In the communication system, CCA 102 is measured in the first primary channel 110 and the first secondary channel 120 allocated to the STAs 100 of the first system and the second primary channel 170 and the second secondary channel 160 allocated to the STAs 150 of the second system. Through the measured CCA 102, ACI in the first primary channel 110 and the first secondary channel 120 and ACI in the second primary channel 170 and the second secondary channel 160 are checked. At this time, when the ACI is checked through the CCA 102, a first threshold corresponding to the first primary channel 110 and the first secondary channel 120, that is, first reference CCA and a second threshold corresponding to the second primary channel 170 and the second secondary channel 160, that is, second reference CCA are different from each other. Accordingly, unfairness exists between the STAs 110 of the first system and the STAs 150 of the second system.

Through the measured CCA 102, ACI in the first primary channel 110 and the first secondary channel 120 and ACI in the second primary channel 170 and the second secondary channel 160 are checked. At this time, when the ACI is checked through the CCA 102, a first threshold corresponding to the first primary channel 110 and the first secondary channel 120, that is, first reference CCA and a second threshold corresponding to the second primary channel 170 and the second secondary channel 160, that is, second reference CCA are different from each other. Accordingly, unfairness exits between the STAs 110 of the first system and the STAs 150 of the second system.

That is, the CCA 102 is compared to the first and second thresholds so as to check the ACI in the first primary channel 110 and the first secondary channel 120 and the ACI in the second primary channel 170 and the second secondary channel 160. At this time, since the first and second thresholds are different from each other, it is determined through the CCA 102 that the first secondary channel 120 is in a busy state and the second secondary channel 160 is in a not-busy state. Accordingly, unfairness exists between the STAs 100 of the first system and the STAs 150 of the second system. Then, referring to FIGS. 2 to 4, fairness and unfairness in an OBSS in the communication system in accordance with the embodiment of the present invention will be described in more detail.

Figure 2:
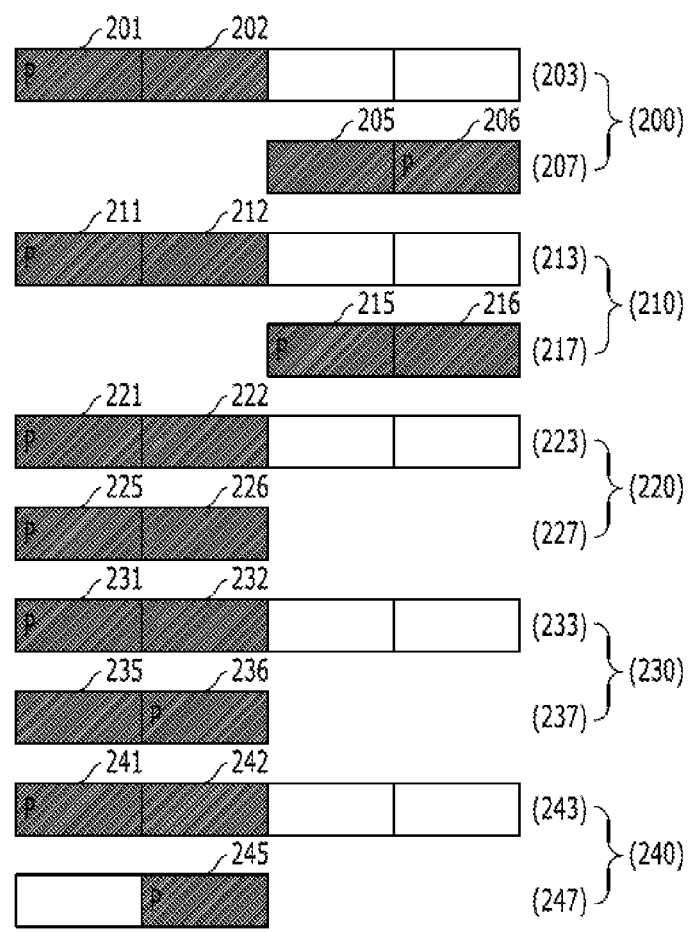
FIGS. 2 to 4 are diagrams for explaining fairness and unfairness in an OBSS in the communication system in accordance with the embodiment of the present invention.
Figure 3:
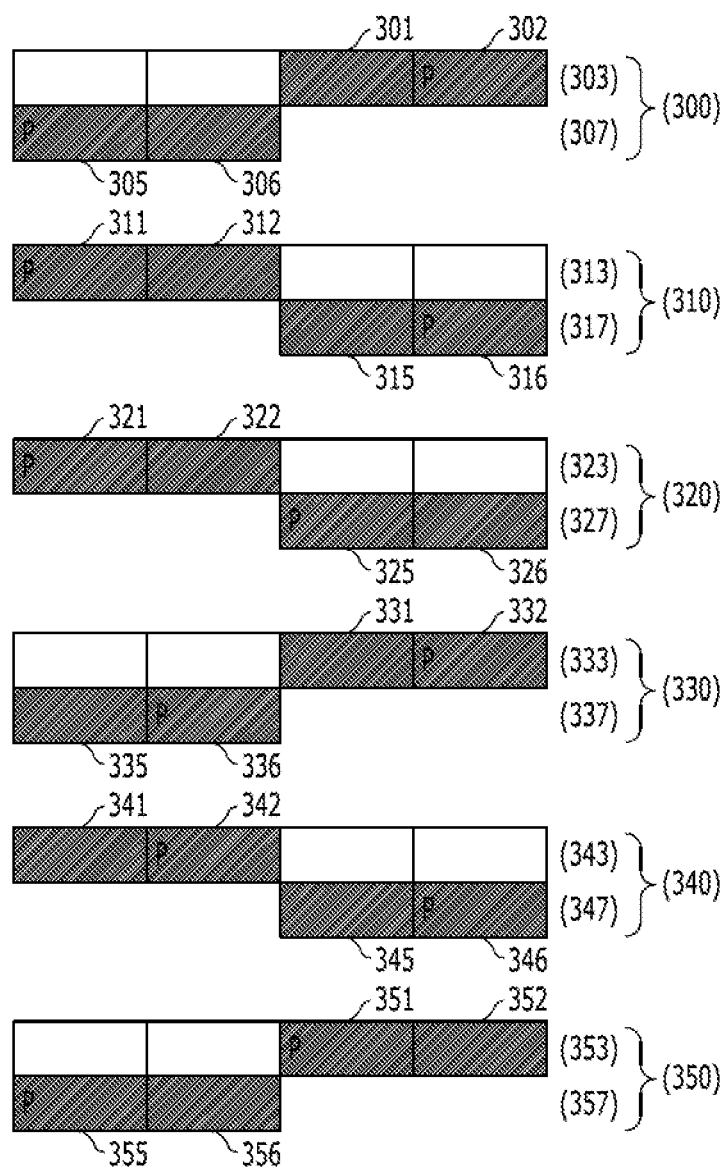
Figure 4:
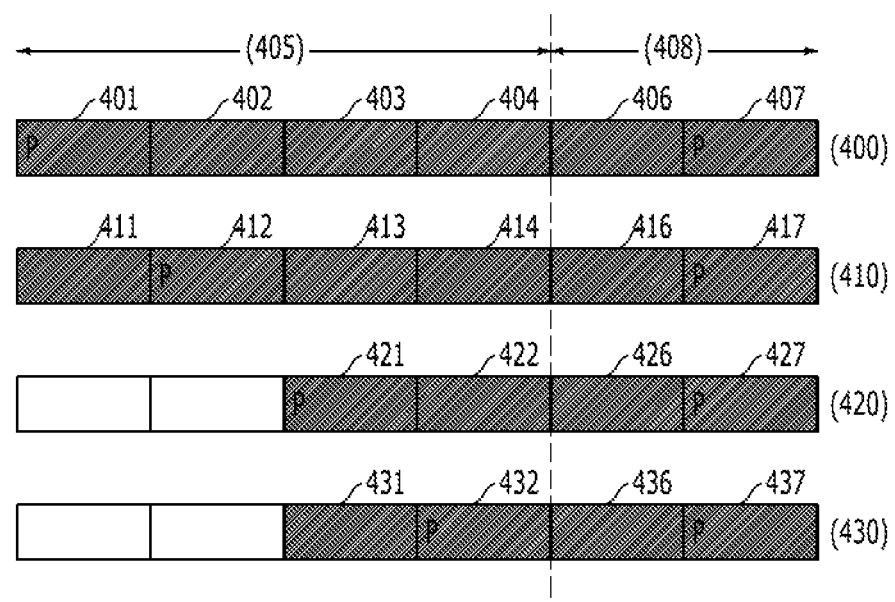

FIGS. 2 to 4 are diagrams for explaining fairness and unfairness in an OBSS in the communication system in accordance with the embodiment of the present invention.

Referring to FIGS. 2 to 4, first primary channels 201, 211, 221, 231, 241, 302, 311, 321, 332, 342, 351, 401, 412, 421, and 432 and first secondary channels 202, 212, 222, 232, 242, 301, 312, 322, 331, 341, 352, 402, 403, 404, 411, 413, 414, 422, and 431 are allocated to STAs 203, 213, 223, 233, 243, 303, 313, 323, 333, 343, 353, and 405 of a first system as an OBSS in the communication system, and second primary channels 206, 215, 225, 236, 245, 305, 316, 325, 336, 346, 355, 407, 417, 427, and 437 and second secondary channels 205, 216, 226, 235, 306, 315, 326, 335, 345, 356, 406, 416, 426, and 436 are allocated to STAs 207, 217, 227, 237, 247, 307, 317, 327, 337, 347, 357, and 408 of a second system.

In the first primary channels 201, 211, 221, 231, 241, 302, 311, 321, 332, 342, 351, 401, 412, 421, and 432 and the first secondary channels 202, 212, 222, 232, 242, 301, 312, 322, 331, 341, 352, 402, 403, 404, 411, 413, 414, 422, and 431 and the second primary channels 206, 215, 225, 236, 245, 305, 316, 325, 336, 346, 355, 407, 417, 427, and 437 and the second secondary channels 205, 216, 226, 235, 306, 315, 326, 335, 345, 356, 406, 416, 426, and 436, which are allocated to the STAs 203, 213, 223, 233, 243, 303, 313, 323, 333, 343, 353, and 405 of the first system and the STAs 207, 217, 227, 237, 247, 307, 317, 327, 337, 347, 357, and 408 of the second system, respectively, CCA is measured to check ACI. As described above, fairness and unfairness of the STAs 203, 213, 223, 233, 243, 303, 313, 323, 333, 343, 353, and 405 of the first system and the STAs 207, 217, 227, 237, 247, 307, 317, 327, 337, 347, 357, and 408 of the second system are checked.

For example, in the STAs 203, 213, 223, 233, 243, 303, 313, 323, 333, 343, 353, and 405 of the first system and the STAs 207, 217, 227, 237, 247, 307, 317, 327, 337, 347, 357, and 408 of the second system, unfairness exists between the first primary channels 201, 302, and 401 and the first secondary channels 202, 301, 402, 403, and 404 and the second primary channels 206, 305, and 407 and the second secondary channels 205, 306, and 406 in first methods 200, 300, and 400, between the first primary channels 211, 311, and 412 and the first secondary channels 212, 312, 411, 413, and 414 and the second primary channels 215, 316, and 417 and the second secondary channels 216, 315, and 416 in second methods 210, 310, and 410, between the first primary channels 321 and 421 and the first secondary channels 322 and 422 and the second primary channels 325 and 427 and the second secondary channels 326 and 426 in third methods 320 and 420, and between the first primary channel 332 and the first secondary channel 331 and the second primary channel 336 and the second secondary channel 335 in a fourth method 330.

Furthermore, in the STAs 203, 213, 223, 233, 243, 303, 313, 323, 333, 343, 353, and 403 of the first system and the STAs 207, 217, 227, 237, 247, 307, 317, 327, 337, 347, 357, and 408 of the second system, fairness exists between the first primary channel 221 and the first secondary channel 222 and the second primary channel 225 and the second secondary channel 226 in the third method 220, between the first primary channels 236 and 432 and the second secondary channels 235 and 431 and the second primary channels 236 and 437 and the second secondary channels 235 and 436 in the fourth methods 230 and 430, between the first primary channels 241 and 342 and the second secondary channel 341 and the second primary channels 245 and 346 and the second secondary channel 345 in the fifth methods 240 and 340, and between the first secondary channel 352 and the first secondary channel 352 and the second primary channel 355 and the second secondary channel 356 in a sixth method 350. Now, referring to FIG. 5, a channel allocation apparatus in a communication system in accordance with an embodiment of the present invention will be described in more detail.

Figure 5:
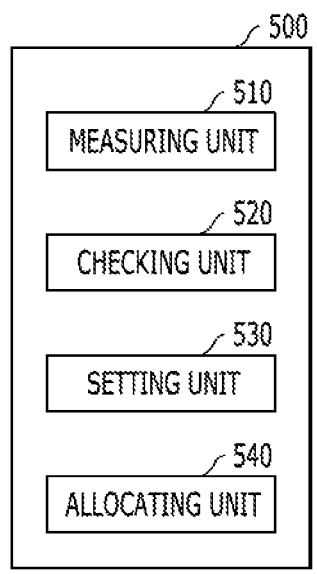
FIG. 5 schematically illustrates the configuration of a channel allocation apparatus in a communication system in accordance with an embodiment of the present invention

FIG. 5 schematically illustrates the configuration of a channel allocation apparatus in a communication system in accordance with an embodiment of the present invention.

Referring to FIG. 5, the channel allocation apparatus 500 includes a measuring unit 510, a checking unit 520, a setting unit 530, and an allocating unit 540. The measuring unit 510 is configured to measure CCA in channels of STAs, for example, in primary and secondary channels of the STAs. The checking unit 520 is configured to check ACI, unfairness, and fairness in the primary and secondary channels of the STAs through the measured CCA. The setting unit 530 is configured to change and set a threshold of the CCA based on the unfairness in the primary and secondary channels of the STAs, that is, reference CCA. The allocating unit 540 is configured to allocate the primary and secondary channels of the STAs such that the STAs have fairness, in response to the measured CCA and the set reference CCA.

The measuring unit 510 measures CCA, and the checking unit 520 checks the unfairness and fairness of the STAs through the measured CCA, as described with reference to FIGS. 2 to 4. Furthermore, the checking unit 520 checks ACI in the primary and secondary channels of the STAs through the CCA.

Since the systems in the OBSS, for example, the first and second systems have different reference CCAs from each other, unfairness exists between the primary and secondary channels of the STAs of the first system and the primary and secondary channels of the STAs of the second system. Therefore, the setting unit 430 changes the reference CCAs of the first and second systems such that fairness exists between the primary and secondary channels of the STAs of the first system and the primary and secondary channels of the STAs of the second system.

The allocating unit 540 changes and allocates the primary and secondary channels of the STAs of the first system and the primary and secondary channels of the STAs of the second system, according to the above-described fairness and ACI. Therefore, in the primary and secondary channels of the STAs of the first system and the primary and secondary channels of the STAs of the second system, ACI is minimized, and fairness exists. That is, the allocating unit 540 allocates primary and secondary channels of the STAs in which fairness is guaranteed and ACI is minimized, or particularly, primary channels. Now, referring to FIG. 6, a channel allocation operation in a communication system in accordance with the embodiment of the present invention will be described in more detail.

Figure 6:
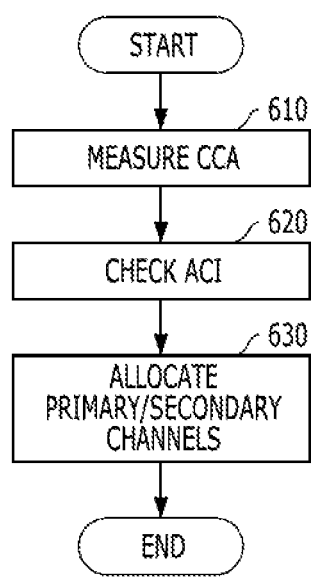
FIG. 6 is a flowchart schematically showing a channel allocation process of the channel allocation apparatus in accordance with the embodiment of the present invention.

FIG. 6 is a flowchart schematically showing a channel allocation process of the channel allocation apparatus in accordance with the embodiment of the present invention.

Referring to FIG. 6, the channel allocation apparatus measures CCA in channels of STAs, for example, primary and secondary channels of the STAs at step S610.

At step S620, ACI, unfairness, and fairness are checked in the primary and secondary channels of the STAs through the measured CCA. Since the unfairness and fairness in the primary and secondary channels of the STAs have been specifically described above, the detailed descriptions thereof are omitted herein.

At step S630, a threshold of CCA based on the unfairness in the primary and secondary channels of the STAs, that is, reference CCA is changed and set, and the primary and secondary channels of the STAs are allocated in response to the measured CCA and the set reference CCA such that the STAs have fairness.

In the communication system in accordance with the embodiment of the present invention, CCAs of the STAs included in the IEEE 802.11n system and the STAs included in the IEEE 802.11ac system in the OBSS are measured, unfairness and ACI in the STAs included in the IEEE 802.11n system and the STAs included in the IEEE 802.11ac system are checked based on the CCAs, the reference CCA in channels of the STAs in an unfair state, or particularly, primary and secondary channels is changed, and the primary and secondary channels of the STAs are changed and allocated to the STAs according to the measured CCA and the changed reference CCA, thereby guaranteeing the fairness in the primary and secondary channels of the STAs and minimizing the ACI. Accordingly, in the communication system in accordance with the embodiment of the present invention, when data are transmitted to and received from the plurality of STAs of the IEEE 802.11ac system and the plurality of STAs of the IEEE 802.11n system, the ACI is minimized, and the fairness is given to the STAs so as to normally transmit and receive large-volume data. That is, the channels are allocated to the STAs so as to give fairness in the primary and secondary channels of the STAs through CCA. Accordingly, ACI may be minimized to normally transmit and receive data.

In the embodiment of the present invention, the channels are allocated to a plurality of STAs so as to minimize ACI in the channels allocated to the STAs through the CCA. When data are transmitted and received through the channels allocated to the STAs, ACI in the allocated channels may be minimized to normally transmit and receive large-volume data. Accordingly, data transmission and reception performance through limited frequency channels may be improved, and the use efficiency of the limited frequency channels may be maximized.

While the present invention has been described with respect to the specific embodiments, it will be apparent to those skilled in the art that various changes and modifications may be made without departing from the spirit and scope of the invention as defined in the following claims.

What is claimed is:

1. A channel allocation apparatus in a communication system, comprising:
    a processor; and
    a non-transitory computer-readable medium having stored thereon instructions that, when executed, cause the processor to perform a method, the method comprising:
        measuring clear channel assessments (CCAs) of a plurality of stations (STAs) included in the communication system for primary and secondary channels of the plurality of STAs,
    wherein the communication system includes a first system and a second system, and
    wherein the plurality of stations includes a first plurality of STAs of the first system and a second plurality of STAs of the second system;
        comparing the measured CCAs to a preset reference CCA, and checking fairness and unfairness for the first plurality and the second plurality of STAs in the primary and secondary channels of the plurality of STAs;
        changing the preset reference CCA according to unfairness of the first plurality of STAs in the primary and secondary channels of the plurality of STAs, such that the plurality of STAs have the fairness in the primary and secondary channels; and
        changing primary and secondary channels of the first plurality of STAs corresponding to the unfairness in the plurality of STAs according to the measured CCAs and the changed preset reference CCA, such that the first plurality of STAs have the fairness in the changed primary and secondary channels of the first plurality of STAs, and allocating the changed primary and secondary channels to the first plurality of STAs,
    wherein an interference between the changed primary and secondary channels is minimized, and the fairness exists in between the changed primary and secondary channels,
    wherein unfairness exists between the primary and secondary channels of the first plurality of STAs included in the first system and primary and secondary channels of the second plurality of STAs included in the second system when the first and second systems have different reference CCAs.

2. The channel allocation apparatus of claim 1, wherein the checking comprises checking adjacent channel interference (ACI) in the primary and secondary channels of the plurality of STAs through the measured CCAs.

3. The channel allocation apparatus of claim 2, wherein the allocating further comprises allocating the primary and secondary channels of the plurality of STAs so as to minimize the ACI in the allocated primary and secondary channels of the plurality of STAs, according to the measured CCAs.

4. The channel allocation apparatus of claim 1, wherein the plurality of STAs is included in an IEEE 802.11n system and an IEEE 802.11ac system of an overlapping basic service set (OBSS) based on the IEEE 802.11n system and the IEEE 802.11ac system.

5. A channel allocation method in a communication system, the method comprising:
    measuring clear channel assessments (CCAs) of a plurality of stations (STAs) included in the communication system for primary and secondary channels of the STAs,
    wherein the communication system includes a first system and a second system, and
    wherein the plurality of STAs includes a first plurality of STAs of the first system and a second plurality of STAs of the second system;
    checking fairness and unfairness for the first plurality and second plurality of STAs by comparing the measured CCAs to a preset reference CCA in the primary and secondary channels of the plurality of STAs;
    changing the preset reference CCA according to the unfairness of the first plurality of STAs in the primary and secondary channels of the plurality of STAs, such that the plurality of STAs have the fairness in the primary and secondary channels;
    changing primary and secondary channels of the first plurality of STAs corresponding to the unfairness in the plurality of STAs, according to the measured CCAs and the changed preset reference CCA, such that the first plurality of STAs have the fairness in the first changed primary and secondary channels of the first plurality of STAs; and
    allocating the changed primary and secondary channels to the first plurality of STAs,
    wherein an interference between the changed primary and secondary channels is minimized, and the fairness exists in between the changed primary and secondary channels,
    wherein unfairness exists between primary and secondary channels of the first plurality of STAs included in the first system and primary and secondary channels of the second plurality of STAs included in the second system when the first and second systems have different reference CCAs.

6. The channel allocation method of claim 5, wherein checking the fairness and unfairness of the first plurality and the second plurality of STAs comprises checking adjacent channel interference (ACI) in primary and secondary channels of the plurality of STAs through the measured CCAs.

7. The channel allocation method of claim 6, wherein allocating the changed primary and secondary channels to the first plurality of STAs comprises allocating the primary and secondary channels of the plurality of STAs so as to minimize the ACI in the allocated primary and secondary channels of the plurality of STAs, according to the measured CCAs.

8. The channel allocation method of claim 5, wherein the plurality of STAs is included in an IEEE 802.11n system and an IEEE 802.11ac system of an overlapping basic service set (OBSS) based on the IEEE 802.11n system and the IEEE 802.11ac system.

* * * * *